United States Patent [19]

Schur

[11] 3,916,626

[45] Nov. 4, 1975

[54] THERMALLY POWERED GENERATING SYSTEM EMPLOYING A HEAT VAPOR BUBBLE ENGINE

[76] Inventor: George O. Schur, 3775 SW. 108th Ave., Miami, Fla. 33165

[22] Filed: May 31, 1974

[21] Appl. No.: 474,915

[52] U.S. Cl. ........................ 60/496; 60/531; 60/641
[51] Int. Cl. ........................... F03b 1/02; F03g 7/00
[58] Field of Search ............. 60/496, 530, 531, 645, 60/651, 670, 671

[56] References Cited
UNITED STATES PATENTS

| | | | |
|---|---|---|---|
| 211,143 | 1/1879 | Fogarty | 60/496 |
| 271,040 | 1/1883 | Cook | 60/496 |
| 3,715,885 | 2/1973 | Schur | 60/496 |

*Primary Examiner*—Martin P. Schwadron
*Assistant Examiner*—Allen M. Ostrager

[57] ABSTRACT

A thermal power generating system including a heat engine consisting of a generally egg-shaped vapor vacuum-sealed container and a heat-transfer fluid circuit, the fluid circuit including a heat source such as a solar heater or an arrangement for utilizing the temperature differential between the surface region and the bottom region of a deep body of water. The engine employs as a working fluid a liquid with a low boiling point in the container, the heat-transfer circuit passing through a heat exchanger containing cells connected by conduits to the bottom end of the container, so that heat is conducted to the working fluid, causing bubbles to be generated in the cells. The bubbles flow upwardly through the conduits and enter chambers of a rotor assembly. The top of the engine consists of a condenser exposed to ambient temperature. The chambers are provided with flap valves operated by radial rods whose inner ends engage a fixed cam provided on a stationary rotor bearing shaft. The flap valves are controlled by the cam so as to be open at their respective top and bottom positions and closed during upward movement of the rotor chambers, allowing the upwardly moving bubbles to drive the rotor and then escape into the condenser where they are liquified and return to the lower portion of the container. The rotor assembly is magnetically coupled to an external load device.

22 Claims, 12 Drawing Figures

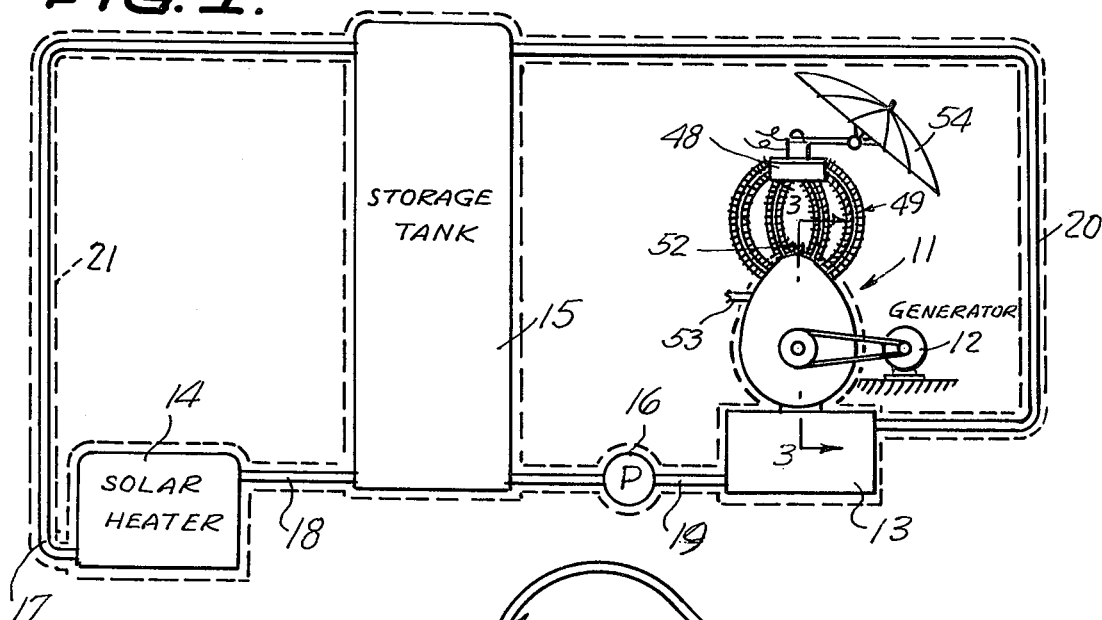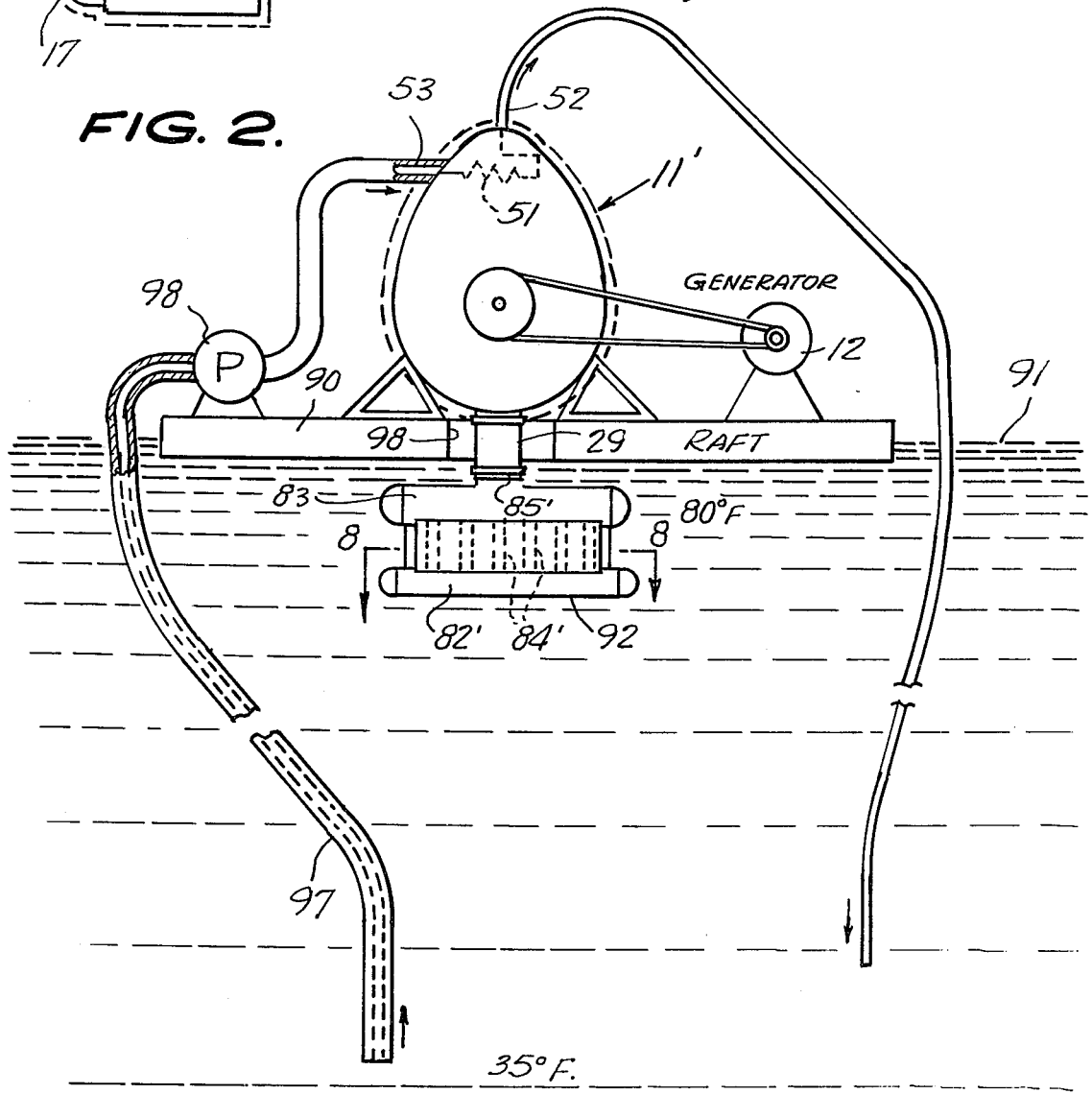

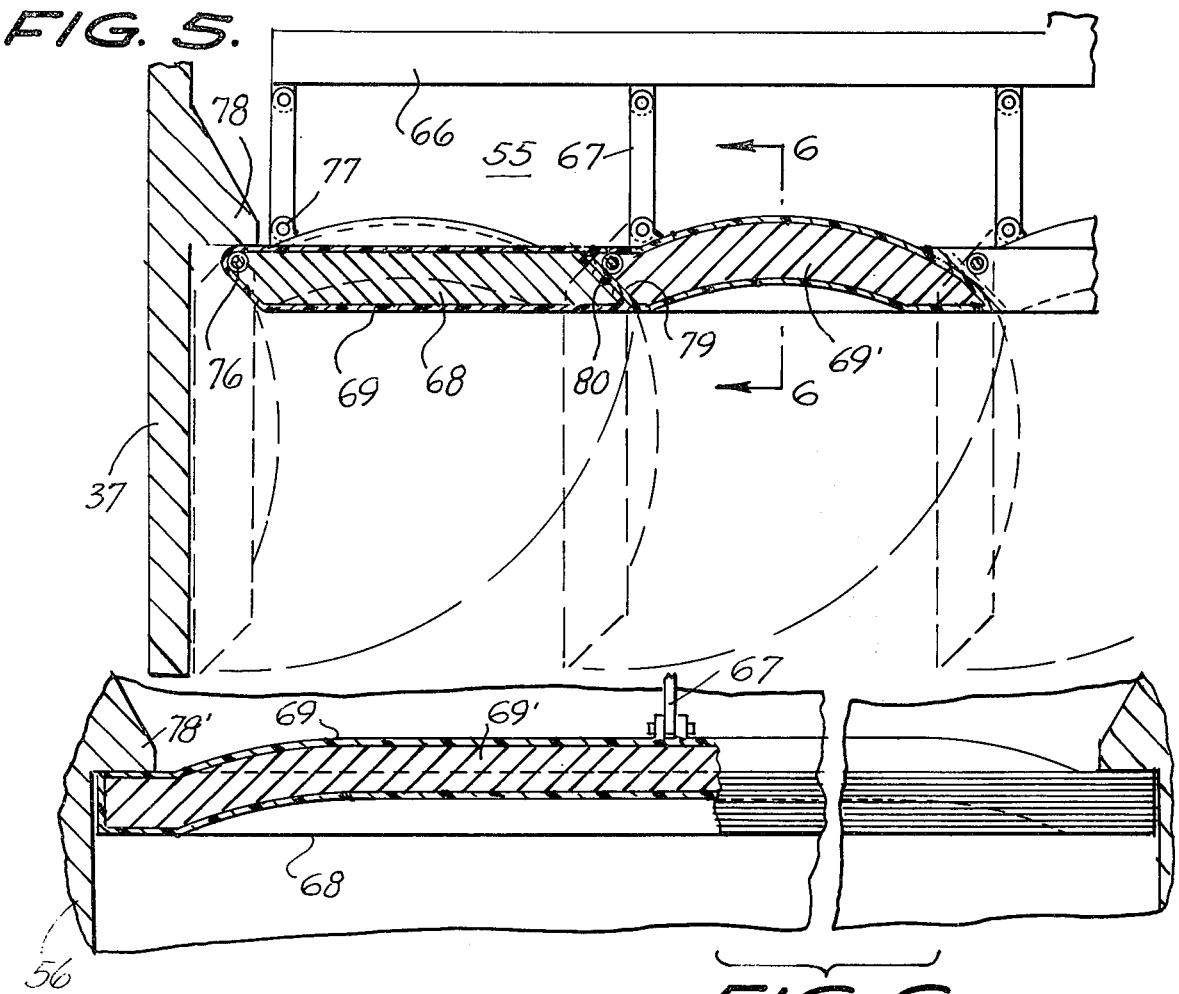
FIG. 5.
FIG. 6.
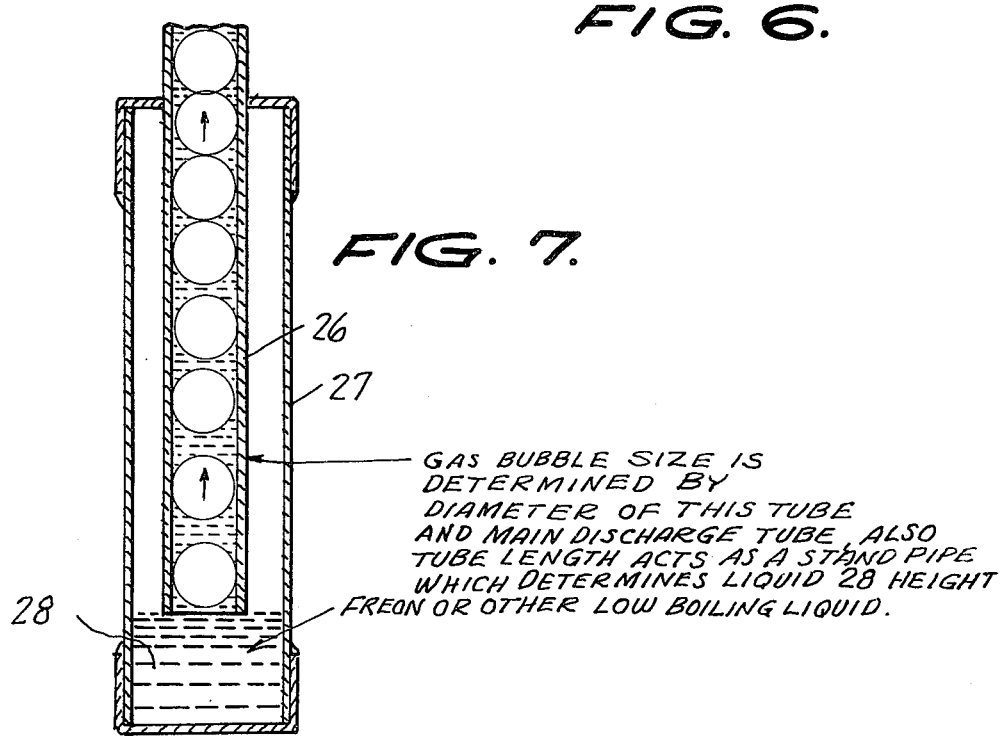
FIG. 7.
GAS BUBBLE SIZE IS DETERMINED BY DIAMETER OF THIS TUBE AND MAIN DISCHARGE TUBE. ALSO TUBE LENGTH ACTS AS A STAND PIPE WHICH DETERMINES LIQUID 28 HEIGHT FREON OR OTHER LOW BOILING LIQUID.

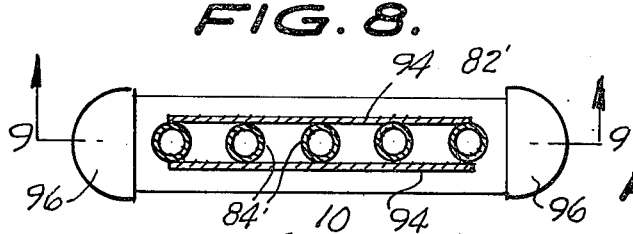
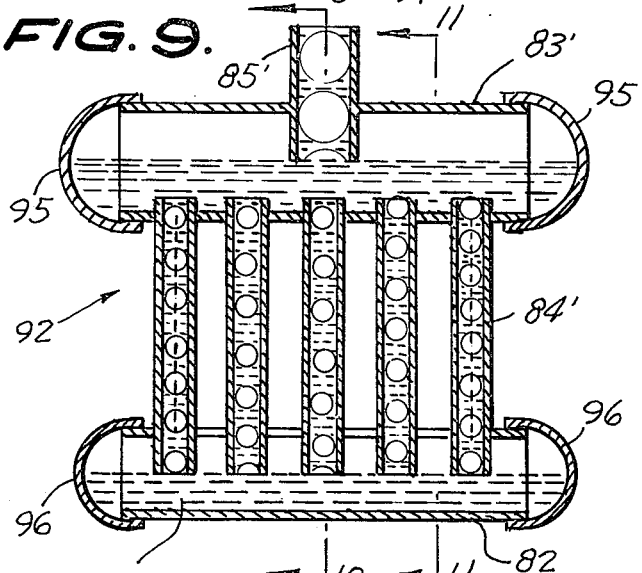
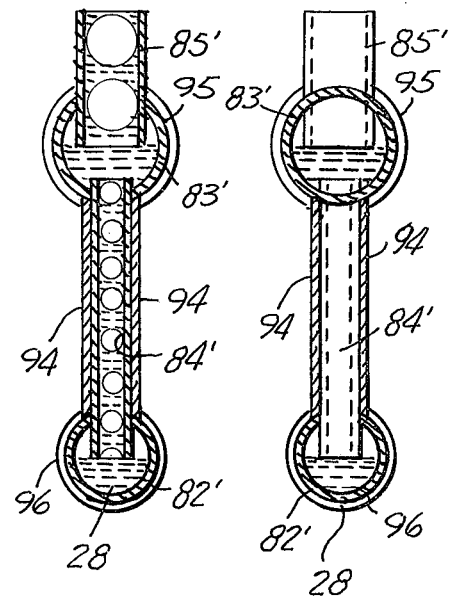
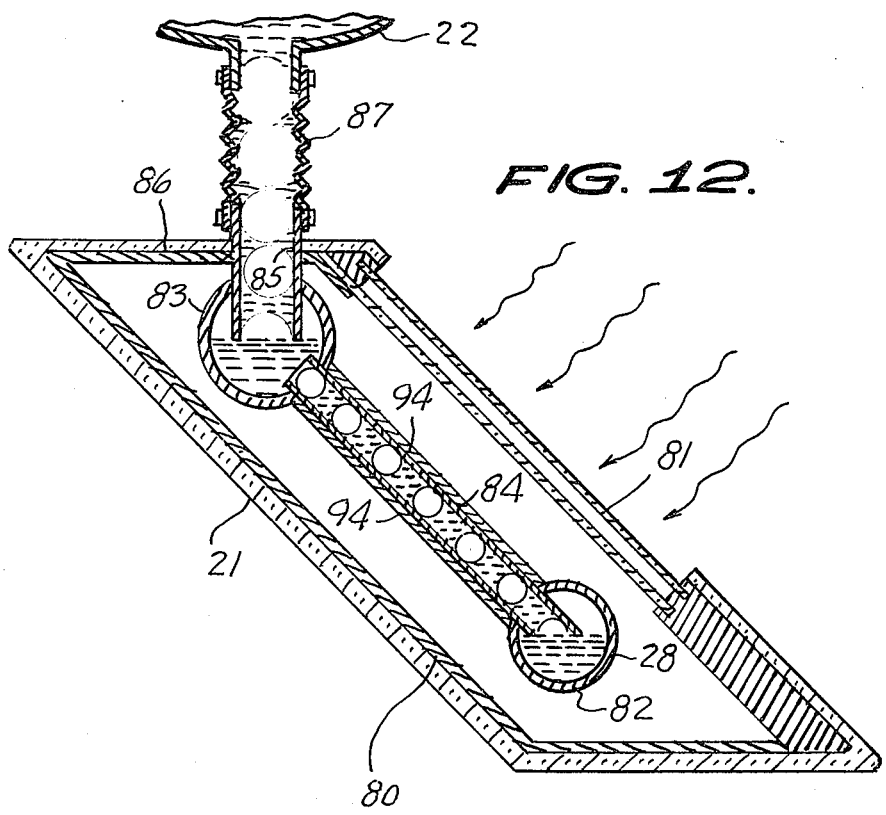

THERMALLY POWERED GENERATING SYSTEM EMPLOYING A HEAT VAPOR BUBBLE ENGINE

This invention relates to thermal power generating systems, and more particularly to a thermal power generating system including a heat engine of the type employing a liquid with a low boiling point as a working fluid and utilizing upwardly rising bubbles generated in the liquid to develop mechanical power.

A main object of the invention is to provide a novel and improved thermal power generating system which is adapted to be operated by thermal energy available in nature, and which employs a novel and improved heat engine, the engine being simple in construction, being very economical to operate, and which is suitable for a wide range of applications intended to utilize heat from natural sources such as solar energy, geothermal energy such as heat from hot springs, or the like, or Delta-T energy such as heat contained in bodies of water.

A further object of the invention is to provide an improved heat engine, which is durable in construction, which is quiet in operation, and which requires relatively small maintenance attention.

A still further object of the invention is to provide an improved power generating system utilizing natural sources of heat such as solar energy and heat contained in bodies of water, and the like, the system being relatively inexpensive to fabricate, having high efficiency, and having a relatively high power output capacity per unit of weight.

Further objects and advantages of the invention will become apparent from the following description and claims, and from the accompanying drawings wherein:

FIG. 1 is a diagrammatic showing of a typical improved thermal power generating system constructed in accordance with the present invention, employing solar energy.

FIG. 2 is an elevational view, partly in cross-section, showing another improved thermal power generating system according to the present invention, employed to utilize the temperature differential between the surface region and the bottom region of a body of water.

Figure 4:
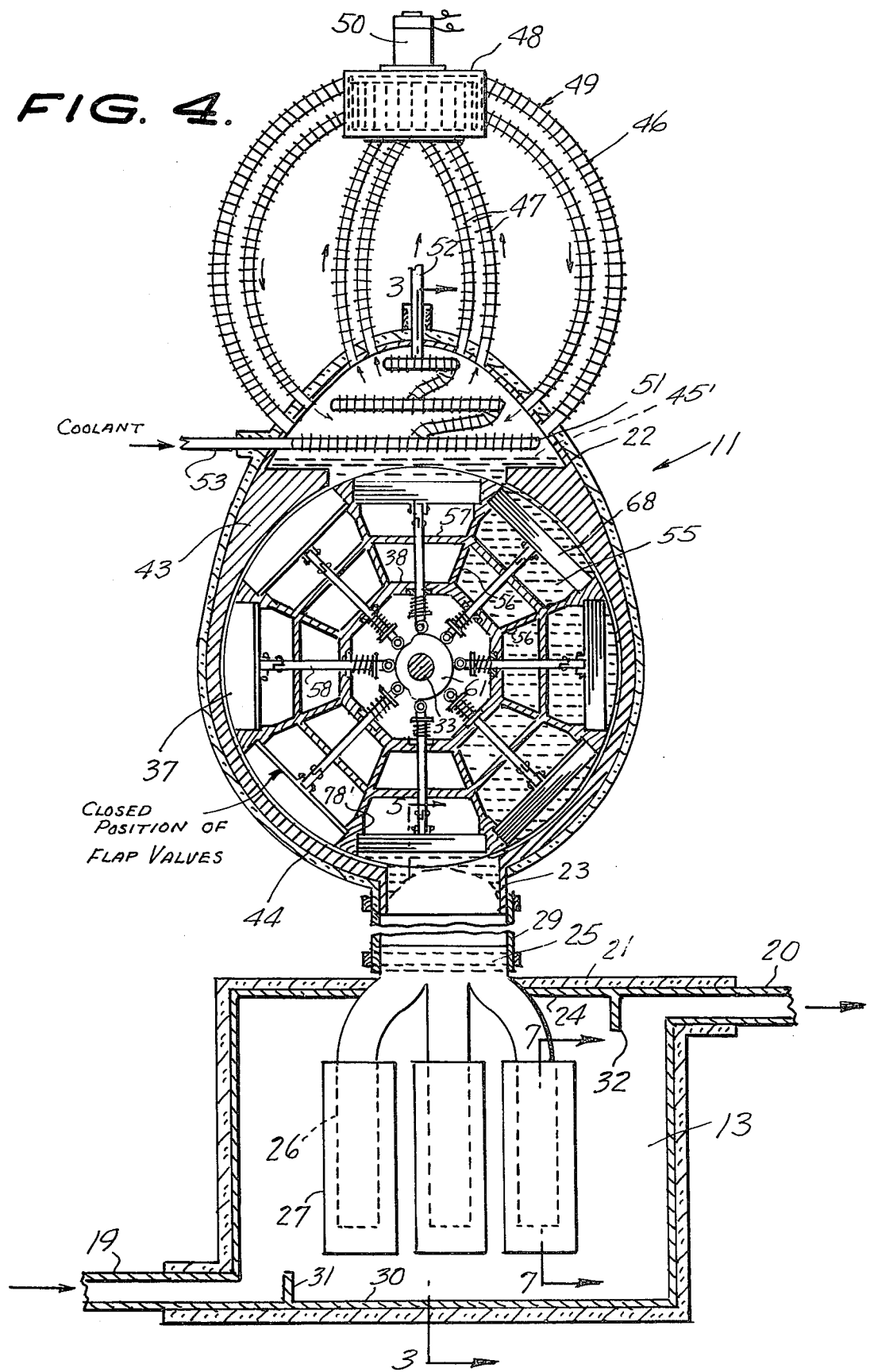
FIG. 4 is a vertical cross-sectional view taken substantially on line 4—4 of FIG. 3.

FIG. 5 in an enlarged fragmentary vertical cross-sectional view taken substantially on line 5—5 of FIG. 4.

FIG. 6 is a vertical cross-sectional view, partly in elevation, taken substantially on line 6—6 of FIG. 5.

FIG. 7 is an enlarged vertical cross-sectional detailed view taken substantially on line 7—7 of FIG. 4.

FIG. 8 is an enlarged horizontal cross-sectional view taken substantially on line 8—8 of FIG. 2.

FIG. 9 is a vertical cross-sectional view taken substantially on line 9—9 of FIG. 8.

FIG. 10 is a transverse vertical cross-sectional view taken substantially on line 10—10 of FIG. 9.

FIG. 11 is a tranverse vertical cross-sectional view taken substantially on line 11—11 of FIG. 9.

FIG. 12 is an enlarged fragmentary vertical cross-sectional view taken transversely through a modified form of heat exchanger and bubble-generating cell elements which may be employed in a solar energy-utilizing system as that shown in FIG. 1.

Figure 3:
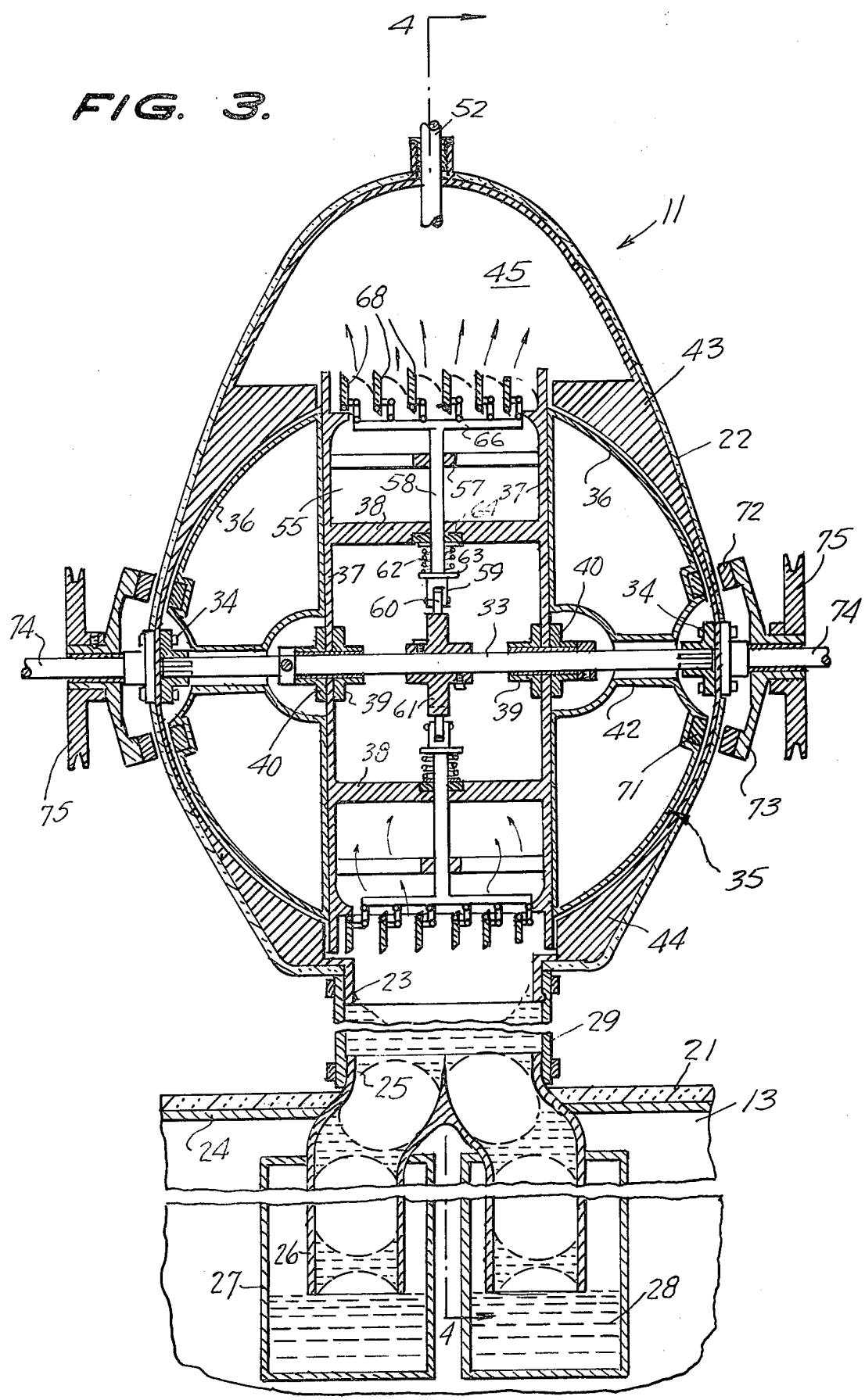
FIG. 3 is an enlarged transverse vertical cross-sectional view taken through the heat engine employed in the system of FIG. 1, said view being taken substantially on the line 3—3 of FIG. 1.

Referring to the drawings, and more particularly to FIGS. 1, 3 and 4, a typical thermal power generating system according to the present invention is illustrated, the system including a heat engine, shown generally at 11 arranged to drive a suitable load, for example, an electrical generator 12.

The heat engine 11 is mounted on heat exchanger assembly 13, presently to be described. The heat exchanger assembly 13 being connected in a heat-transfer fluid circuit including a heat source, namely, a solar heater 14, a storage tank 15 for the heated medium, for example, water, and a circulation pump 16. The solar heater 14 may be of any suitable type, for example, a container having a transparent panel exposed to solar rays and having inlet and outlet conduits 17 and 18 connected respectively to the top and bottom portions of the storage tank 15, as shown in FIG. 1. A supply conduit 19 including the circulation pump 16 connects the bottom portion of tank 15 to the lower portion of the heat exchanger assembly 13, and the upper portion of the heat exchanger assembly 13 is connected by a conduit 20 to the top portion of storage tank 15. The various elements of the heat-transfer fluid circuit, including the storage tank 15, the various conduits, and the opaque portion of the solar heater 14 are provided with suitable heat-insulating covering, shown at 21, to minimize heat loss. The heated water is circulated by the pump 16 rightwardly through the heat exchanger assembly 13 and back to the storage tank 15, furnishing heat to the engine 11 to drive the engine in a manner presently to be explained.

Referring now to FIGS. 3 and 4, it will be seen that the engine comprises a hermetically sealed container 22 of generally egg-shaped configuration which is vertically arranged and which has a downwardly extending bottom conduit portion 23. The heat exchanger assembly 13 comprises a rigid enclosure which may be of any suitable shape, for example, which may be of generally rectangular shape as typically illustrated in the drawings, having a top wall 24 in which is rigidly secured the upwardly projecting conduit member 25 integrally formed with a plurality of downwardly extending branch conduits 26 which are sealingly secured in respective bubble-generating cells 27 in the manner shown in FIGS. 3 and 4. In the typical example illustrated in FIGS. 3 and 4, there are six downwardly extending branch conduit elements 26 which are sealingly secured in a corresponding number of bubble-generating cells 27, the branch conduits being ridigly secured in the top walls of the cells and extending downwardly therin for the major portion of the height of the cells. As will be seen in FIG. 3, the cells contain liquid 28 having a relatively low boiling point and being of a non-corrosive nature, as well as being relatively imflammable. For example, the working fluid 28 may comprise Freon, such as Refrigerant Freon 22 which is substantially non-flammable and which has a boiling point of −41° F.

The conduit elements 23 and 25 are sealingly and communicatively connected by a vertical conduit member 29 whose ends are respectively clampingly and sealingly secured on the depending conduit portion 23 and the upstanding conduit portion 25, as shown in FIG. 3.

As shown in FIG. 4, the bottom wall 30 of the heat exchanger enclosure is provided with an upstanding transversely extending baffle plate 31 located rightwardly adjacent the inlet end of conduit 19, as viewed in FIG. 4, and serving to direct the incoming heated liquid upwardly in a manner to guide it so as to flow substantially horizontally past the vertically arranged bubble-generating cells 27, so as to efficiently transmit heat thereto, the liquid then being forced to leave the enclosure through the return conduit 20 located at the upper right corner portion of the enclosure, as viewed in FIG. 4, by the pressure exerted thereon by circulation pump 16. A depending transversely extending baffle plate 32 is provided on the top wall 24 located leftwardly adjacent the outlet end leading to conduit 20, as viewed in FIG. 4, to provide efficient guiding action for the flow of the liquid through the heat exchange enclosure.

Rigidly secured in the midportion of the egg-shaped container 22, namely, substantially in the plane of maximum horizontal cross-sectional area, is a bearing shaft 33, for example, by means of opposite socket members 34, 34 splined on the opposite end portions of the shaft 33 and rigidly secured to opposite wall portions of container 22, as shown in FIG. 3. A generally spherical rotor assembly, designated generally at 35 is rotatably mounted on the fixed horizontal bearing shaft 33, the rotor assembly comprising opposite hollow dome filler elements 36, 36 which are rigidly secured to respective circular disc members 37, 37 which are spaced apart by axially extending spacer walls 38 rigidly secured therebetween and defining the inner end walls of respective radially extending chambers, presently to be described. The circular walls 37 are provided with respective journal bearing bushings 39 for rotatably supporting the rotor assembly on the fixed bearing shaft 33. Respective thrust bearing collars 40 are secured on bearing shaft 33 outwardly adjacent the circular disc members 37 to maintain the rotor assembly in a suitable centered position on the bearing shaft 33. The dome-shaped members 36 are provided with suitably contoured core elements 42 surrounding shaft 33 and suitably shaped to provide clearance for the shaft as well as for the thrust bearing members 40 and the socket members 34, as is clearly shown in FIG. 3. Suitable annular filler blocks 43 and 44 are rigidly secured to the inner surface portions of the container 22 above and below the rotor assembly 35, said filler blocks being conformably shaped to accommodate the spherically-shaped dome elements 36, 36 with a sufficient clearance between the filler blocks 43, 44 and the dome elements to allow free flow of condensed working fluid downwardly, as will be presently described. The blocks 43, 44 may be integrally connected. The filler blocks 43, 44 and the dome elements 36, 36 reduce the amount of liquid required to operate the engine. The elements 36, 36 are buoyant and reduce the weight and friction of rotor 35.

There is thus defined in the top portion of container 22, a space 45 for receiving vaporized working fluid, as will be presently described, and mounted on the top end of the container 22 is a condenser assembly, designated generally at 49, which is in communication with said space 45. Thus, the condenser assembly 49 comprises inner condenser tubes 47 which are communicatively connected to the center portion of the top of container 22, which extend through a blower chamber 48 and which lead to return condenser tubes 46 which are communicatively connected to portions of the top of container 22 spaced substantial distances laterally from the connections of the inner condenser tubes 47, thereby communicating with the space 45 at a substantially lower level than the connections of tubes 47. The blower chamber 48 contains a conventional squirrel cage assembly driven by an electric motor 50 with a magnetic clutch sucking the vapors upwardly through the condenser tubes 47 and pushing the vapor and condensate downwardly through condenser tubes 46, thereby providing a rapid cooling action which stimulates condensation of the vapor and aids in the more rapid liquefaction of the vapor, which returns to space 45 to subsequently descend toward the bubble-generating cells 27. Additional cooling action may be provided by circulating cool liquid, such as cold water, through a coil of condenser tubing 51 provided in space 45, the inlet end of the condenser tubing 51 entering the space below the connections of the condenser tubes 46 thereto and the outlet end of the condenser tubing 51 leaving the space at the top center portion thereof, as is clearly shown in FIG 4 at 52. The inlet portion of the condenser tubing 51, shown at 53 is suitably sealingly secured to the container 22, and the outlet end of the condenser tubing 51 is likewise sealingly secured in a suitable manner at the center top portion of the container.

As shown in FIG. 1, a suitably adjustable umbrella-type sunshield 54 may be provided over the condenser assembly 49.

The rotor assembly 35 is provided between the spaced circular disc members 37, 37 with a plurality of radially extending chambers 55 whose inner ends are defined by the previously mentioned wall members 38. In the typical embodiment illustrated therein, there are eight wall members 38 located at equal radial distances from the axis of bearing shaft 33 and of equal width and length, thereby defining a hollow body of octagonal cross-sectional shape, as shown in FIG. 4. Secured between the disc members 37, 37 and extending radially from the corners of the hexagonally shaped body are plate elements 56 forming the side walls of radially extending chambers 55. The outer portions of the chambers are braced by respective spider members 57 rigidly secured between the radially extending plate members 56. The spider members 57 also are secured to the parallel opposing disc members 37, 37 at their outer end portions, as shown in FIG. 3. The spider members are centrally apertured to serve as supporting guides for respective radially extending follower rods 58 which are provided at their inner ends with brackets 59 in which are journalled rollers 60 engaging the periphery of a cam 61 rigidly secured on the center portion of the fixed bearing shaft 33. The rollers 60 are biased into contact with the periphery of cam 61 by coil springs 62 surrounding the rods 58 and bearing between the respective rear chamber wall members 38 and bearing washers 63 provided on rods 58 and engaging brackets 59, as shown in FIG. 3. The rods 58 pass sealingly through annular gaskets 64 seated in recesses provided therefor in the members 38, as is further shown in FIG. 3.

The follower rods 58 extend slidably through the center portions of the spider members 57, as above mentioned, and are provided on their outer ends with rod-like heat portions 66 which are operatively connected by spaced link members 67 to side-by-side flap valve elements 68 hinged to the outer marginal portions of the respective radially extending wall members 56 defining the aforesaid radial chambers 55. The flap valve elements 68 are preferably suitable covered with resilient deformable, corrosion-resisting sealing material, such as neoprene, or the like, shown at 69. Furthermore, the flap valve elements 68 are beveled at their abutting portions to sealingly interengage when the valve elements 68 are in closed positions as shown in FIG. 5. As is further shown in FIGS. 5 and 6, the flap valve elements 68 may be provided with arcuately shaped intermediate portions 69', whereas their marginal portions are substantially coplanar. In other words, the flap valve elements may be upwardly bowed at their intermediate portions, whereas their marginal portions are in a common plane.

As shown in FIGS. 3 and 4, the flap valve elements 68 thus constitute sets of cooperating hinged louver members provided at the outer ends of the radial chambers 55, the louver members or flap valve elements, being hinged on axes transverse to the axis of rotation of the rotor assembly. As will be presently explained, the follower rods 58 and their rollers 60 coact with the cam 61 to open the flap valve elements and keep them open between the uppermost and lowermost positions of their associated chambers 55 while allowing the flap valve elements to close and seal said chambers when the chambers are moving upwardly. Thus, as shown in FIG. 4, the cam 61 has a configuration whereby the flap valve elements 68 are held closed by their biasing springs 62, from the time shortly after the chambers move past the entry conduit 23 until the chambers reach the top portion of the container, namely, until the chambers reach positions facing the top space 45, assuming clockwise rotation of the rotor assembly, as viewed in FIG. 4. The flap or louver elements 68 are held open for continued movement until the associated chamber again move past the intake bottom conduit elements 23. Thus, bubbles forming in the bubble-generating cells 27 pass upwardly through the conduits 26 and thence through the conduit member 29.

The upwardly moving bubbles pass through the intake conduit 23 and enter the chambers through the spaces defined by the open flap valve elements 68, and as the chambers rotate past the bubble intake conduit 23, the flap valve elements close because of the configuration of cam 61. The flap valve elements are held closed, thereby sealing the chambers and locking the bubbles therein, whereby the upward buoyancy of the bubbles provides driving force to rotate the rotor assembly. As the chambers reach their uppermost positions, the follower rods 58 and their rollers 60 cooperate with the cam 61 to open the flap valve elements and allow the bubbles to escape into space 45, after which the bubbles are cooled by the condenser assembly 49 and by the cooling coil assembly 51, above described, to liquify the vapor in space 45 and in the condenser assembly 49. The normal level of liquid in the machine is approximately as indicated by reference 45', FIG. 4.

As shown in FIG. 7, the working fluid, which may be any refrigerant, such as Freon, shown at 28, is heated by the warm liquid flowing through the enclosure 13 and forms bubbles which move upwardly through the bubble guide conduits 26. The size of the bubbles is determined by the size of conduits 26, and therefore, conduits 26 are designed to provide a suitable size of bubbles. The bubble size is a factor determined by design requirements, such as the number of bubble guide tubes 26, the size of the chambers 55, the load to be driven by the apparatus, and the like. The bubble guide tube 26, acts as a stand pipe and its length determines the level of the liquid 28 in bubble generating cell 27.

As shown in FIG. 3, the rotor assembly includes a plurality of permanent magents 71 arranged in circles at opposite end portions thereof and concentric with the fixed bearing shaft 33. These magnets cooperate with similarly arranged permanent magnets 72 provided on rotatable support members 73 journalled on opposite fixed bearing shafts 74, 74 secured to the opposite side portions of container 22. Rigidly secured to the magnet-supporting members 73 are respective output pulleys 75 by means of which the engine may be employed to drive suitable load means, such as electrical generators 12, or the like. The portions of the magnets 71, 72 facing each other are of opposite polarity so that the pulleys 75 are coupled to the rotor assembly by the magnetic attraction between the respective sets of magnets 72 and 71. Thus, the container 22 is of nonmagnetic material so as to permit the magnetic coupling of the rotor assembly to the externally located load-driving pulleys 75.

As shown in FIG. 5, the flap valve members 68 are hinged between the outer end portions of the respective pairs of radially extending plate members 56 by means of hinge pins 76 extending through the left end edge portions of the flap valve members 68, as viewed in FIG. 5, and the link members 67 are pivotally connected to the flap valve members at points spaced short distances rightwardly from the hinge pin 76, as shown at 77 in FIG. 5. Thus, the associated biasing springs 62 urge the associated bar members 66 away from the flap valve members namely, upwardly as viewed in FIG. 5, biasing the most left-ward flap valve element 68 in FIG. 5 toward abutment with stop shoulders 78, 78' provided on the adjacent disc member 37 and wall 56 similarly biasing the remaining flap valve members in a counterclockwise direction, as viewed in FIG. 5, to urge their leftward beveled edge portions 79 to a sealing engagement with the rightward beveled edge portions 80 of the leftwardly adjacent flap valve members 68. The flap valve members 68 assume their closed positions, as shown in FIG. 5, during the upward movement of the associated chambers 55 due to the configuration provided on the cam 61, as is clearly shown in FIG. 4. As the chambers 55 reach their uppermost position, the flap valve members open, namely, rotate to the dotted view positions thereof shown in FIG. 5, as above explained, as the rollers 60 engage larger-radius portions of the cam 61, and the flap valve members remain open until the associated chambers 55 move past their lowermost positions, as above explained.

In operation of the system shown in FIG. 1, solar-heated liquid from tank 15 is pumped into the enclosure 13 by the pump 16, circulating past the bubble-generating cells 27 and leaving the enclosure 13 through the discharge conduit 20, to thereby return to the storage tank 15. Vapor bubbles are thereby generated in the cells 27 and pass upwardly through the conduits 26, moving into the lowermost chamber 55 presented by the rotor assembly, the chambers 55 moving continuously past the top end of the relatively large bubble inlet conduit 23, whereby the successive chambers 55 receive quantities of vapor bubbles. As the bubble-filled chambers 55 rotate past the intake conduit member 23, the flap valve elements associated with the respective chambers close by the cooperation of the follower rollers 60 with the cam 61, as above-explained, locking the bubbles in the chambers, whereby the bubbles exert buoyant upward force driving the rotor assembly in a clockwise direction, as viewed in FIG. 4. As the vapor-filled chambers reach their uppermost positions, their flap valve elements open in the manner above explained, releasing the bubbles and allowing them to move upwardly into the condensation space 45 and to circulate through the condensation tubes 47 and 46, in the manner above-described, being thereby condensed, both by the action of the ambient atmosphere on the condenser tubes 47 and 46, and also by the action of the coolant coil 51 in the sapce 45. Alternatively, either external condenser 49 or internal condenser 51 may be used alone. The condensed vapor flows in space 45, at level 45', surges into the uppermost chamber 55 when its flap element opens to release vapor bubbles.

Simultaneously, bubbles entering the lowermost chamber 55 from conduit 29, 23 displace condensed liquid in said lowermost chamber which more or less equalizes the liquid entering the rotor assembly at the top. This tends to maintain the upper level of liquid 45' at a nearly constant elevation despite minor fluctuations. There is a pulsating upward and downward flow of condensed liquid in the clearance space around the rotor assembly and liquid flows from this space down the interior surfaces of conduits 23, 29, 25 and 26, to replenish the liquid level in chambers 27. The liquified working fluid thus returns to the bubble-generating cells 27 for repeated exposure to the heat source liquid from tank 15.

FIG. 12 illustrates a modification which may be employed with the engine 11 for solar heating of the low temperature bubble-generating liquid material. Thus, the modified arrangement of FIG. 12 employs an inclined heat exchange enclosure 80 sealed at both ends which may be employed in place of the heat exchange enclosure 13 of the previously described form of the invention, the enclosure 80 being provided with an upwardly facing inclined transparent window 81 oriented to receive solar rays. The bubble-generating assembly is a two stage device comprising a lower horizontally extending, generally cylindrical chamber 82 and an upper generally cylindrical horizontally extending chamber 83 connected to the lower chamber 82 by a plurality of inclined bubble tubes 84. The bottom conduit portion 23 of the engine container 22 is connected to a vertical conduit 85 sealingly secured in the top wall 86 of the heat exchange enclosure and extending into the upper cylindrical bubble-generating chamber 83, as shown in FIG. 12.

The connection between conduit 23 and 85 is preferably made by means of a suitable flexible conduit member 87 to thereby allow some degree of relative movement between the engine container 22 and the heat exchange enclosure 80. In operation of this embodiment, solar rays pass through window 81 and the air within chamber 80 to strike and heat blackened metal plate 94 and the cylinders 83 and 82, thereby generating bubbles into inclined conduit 84 and vertical conduit 85. The air in chamber 80 is also heated by reflected rays and serves to store heat energy for raising the temperature of the bubbling liquid. Bubbles generated into conduits 84, pass upwardly through conduit 85, conduit 87 and conduit 23 and act on the rotor assembly of the associated engine in the same manner as previously described in connection with the embodiment of the invention shown in FIG. 1.

The two stage bubble generator of FIG. 12 multiplies the number of bubbles formed in a given time since bubbles are simultaneously formed in both the upper and lower tubes 83, 82 to increase the flow and bubble vapor pressure delivered to the rotor assembly through conduit 87.

The drawings of FIGS. 8–11 show a similar bubble generator to that of FIG. 12 except that bubble generating tubes 84' are disposed in a vertical plane rather than an inclined plane.

FIG. 2 illustrates a further modification of a power generating system according to the present invention, wherein a heat engine 11', generally similar to that above-described in connection with FIG. 1, is mounted on suitable float means, such as a raft 90 which floats on the surface of a body of water 91 of substantial depth. In this embodiment, the apparatus takes advantage of the substantial difference in temperature between the surface portion of the body of water and the portion thereof at a stubstantial depth below the surface. Thus, the surface portion of the body of water 91 may have a temperature of the order of 80° F. under certain conditions, whereas the temperature at a substantial distance below the surface may be of the order of 35°F. This condition may be found in semitropical regions or other regions where a substantial amount of surface-warming occurs due to heat from the sun.

As shown in FIG. 2, the engine 11' is provided with a depending heat exchanger assembly, shown generally at 92, including a generally cylindrical horizontally extending bottom container 82', in enlarged form in FIGS. 8–11, a generally cylindrical top container 83' and a plurality of spaced vertical bubble tubes 84' communicatively connecting the top and bottom chambers. The top container 83' is provided with a bubble outlet conduit 85', similar to the conduit 85 described above in connection with the embodiment of FIG. 12. The conduit 85' is connected by conduit 29 to the depending bubble inlet conduit 23 of the engine container 22. The bubble tubes 84' depend vertically between the top and bottom chambers 83' and 82' and are provided with front and rear cover plates 94, 94 of metal or other similar heat-conducting material, suitably secured to the bubble tubes 84'. Thus, the cover plates 94, 94 are preferably welded on the opposite sides of the parallel spaced bubble tubes 84' and are also welded to the horizontal cells 82', 83'. The top and bottom containers 83', 82' are provided with suitably secured hemispherical end cover caps, shown at 95 and 96.

Thus, the heat exchange assembly 92 is immersed in the relatively warm water near the surface and receives heat therefrom to generate bubbles in the working fluid in the manner above-described, to thereby drive the rotor assembly of the engine 11'. A conduit 97 extends downwardly to a substantial depth, namely, to a region where the temperature of the water is much lower, for example, of the order of 35°F., as above-mentioned, and the conduit 97 is connected through a pump 98 to the conduit 53 leading to the condenser coil 51 in the condenser space 45 at the top portion of the engine container. The outlet conduit 52 likewise leads to a region of the body of water which is at a substantial depth. Thus, the bubbles reaching the condensation space 45 are cooled by the condenser coil 51 which is supplied with cold water from the conduit 53, causing the bubbles to condense and liquify and descend by gravity down through the engine container in the manner previously described, eventually reaching the bubble-generating assembly to be recycled. The rotor assembly of the engine is driven in the same manner as above-described by the bubbles locked in the upwardly moving chambers 55.

The raft 90 may be of any suitable construction to suitably support the engine 11' and the associated load, for example, an electrical generator 12, similar to the generator described in connection with the embodiment shown in FIG. 1. The raft 90 may be provided with a suitable aperture 98 through which the conduit 29 extends, or may be suitably otherwise constructed to provide a gap or space for said conduit 29.

As above-mentioned, the working fluid employed in the heat engine 11 or 11', above-described, may be any suitable liquid having a relatively low boiling point, such as Freon, or other suitable liquid of a non-corrosive nature having a relatively low boiling point and being relatively inflammable.

While certain specific embodiments of improved power generating systems including heat engines have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A heat engine comprising a hermetically sealed container, a quantity of liquid having a relatively low boiling point in said container, a rotor assembly mounted in said container and having a plurality of radially extending chambers, pivoted flap valve means at the outer ends of said chambers, means biasing said flap valve means to closed positions, means opening said flap valve means respectively at the lowermost and uppermost positions of their associated chambers, heat exchange means beneath the container, bubble-generating cell means in said heat exchange means, conduit means communicatively connecting said cell means to the lower end of said container, means to expose said heat exchange means to a heated medium, whereby to generate vapor bubbles of said liquid in said cell means which pass upwardly through said conduit means and into said chambers and drive said rotor assembly, vapor-condensing means at the top of said container, external driven shaft means, and means coupling said rotor assembly to said external driven shaft means.

2. The heat engine of claim 1, and wherein the means opening said flap valve means comprises cam means operating responsive to rotation of said rotor assembly.

3. The heat engine of claim 2, and wherein said container has a fixed internal portion, and said cam means comprises a cam rigidly secured on said fixed internal portion and follower means connected to said flap valve means and engaging said cam.

4. The heat engine of claim 3, and wherein said fixed internal portion comprises a fixed transverse bearing shaft in said container, said rotor assembly being rotatably mounted on said bearing shaft.

5. The heat engine of claim 4, and wherein said cam is centrally secured on said fixed transverse bearing shaft.

6. The heat engine of claim 5, and wherein said follower means comprises radially extending follower rods slidably mounted in the chambers engaging said cam at their inner ends and operatively connected to the flap valve means at their outer ends.

7. The heat engine of claim 6, and wherein said flap valve means for each chamber comprises a plurality of side-by-side flaps pivoted to the outer end portion of the chamber and linkage means operatively connecting the flaps to the associated follower rod.

8. The heat engine of claim 7, and wherein the means biasing the flap valve means to closed position comprises a coil spring surrounding the associated follower rod and acting between the chamber and the follower rod to urge the associated flap toward closed positions.

9. The heat engine of claim 1, and wherein the means opening said flap valve means comprises cam means operating responsive to rotation of said rotor assembly, said cam means being formed to hold the flap means open during downward movement of their associated chambers and to lock the bubbles in the associated chambers during their upward movement.

10. The heat engine of claim 1 and wherein said container has a fixed transverse internal bearing shaft, said rotor assembly being rotatably mounted on said bearing shaft, and wherein said means opening said flap valve means comprises a cam rigidly mounted on said bearing shaft and follower means connected to said flap valve means and engaging said cam.

11. The heat engine of claim 10, and wherein said external driven shaft means is aligned with said fixed bearing shaft.

12. The heat engine of claim 11, and wherein said means coupling the rotor assembly to said driven shaft means comprises cooperating respective internal external permanent magnets on said rotor assembly and the driven shaft means located to exert mutual magnetic attraction on each other.

13. The heat engine of claim 1, and wherein said container is of generally egg-shaped configuration.

14. The heat engine of claim 13, and wherein said vapor-condensing means includes means for circulating external cooling fluid in thermal-conductive contact with the liquid vapor in the condensing means.

15. The heat engine of claim 1, and wherein said heat exchange means comprises an enclosure surrounding said cell means, and wherein said heated medium comprises a source of heat-absorbing liquid and means to expose the heat-absorbing liquid to solar rays, and pump means to circulate the heat-absorbing liquid through said enclosure.

16. The heat engine of claim 1, and float means for supporting said container on the surface of a body of water with said heat-exchange means immersed in the water immediately below the float means.

17. The heat engine of claim 16, and wherein said vapor-condensing means comprises condenser conduit means in the top portion of the container, and conduit means including a pump to circulate water from a substantial depth below the surface of said body of water through said condenser conduit means.

18. The heat engine of claim 1, wherein said heat exchange means comprises a chamber having a window for transmitting solar rays therethrough.

19. The heat exchange engine of claim 18 wherein said bubble-generating cell is a two stage device including upper and lower chambers connected by a plurality of tubes for conducting the generated bubbles, said tubes and said upper and lower chambers being secured to a pair of heat conducting plates which overlie the bubble-generating tubes and receive the solar rays through said windows.

20. The heat exchange engine of claim 1, and wherein said rotor assembly includes at each side a dome shaped hollow filler member disposed within the container and said liquid coaxially with the remaining parts of said rotor assembly, whereby to lend buoyancy to the rotor assembly and decrease wear of associated bearings.

21. The heat exchange engine means of claim 1, and wherein said vapor-condensing means includes a first condenser disposed externally of said container and a second condenser disposed internally of said container.

22. The heat exchange engine of claim 21, wherein said first condenser includes a first set of upstanding tubes connecting the space at the top of said container with a chamber disposed above the container, and a second set of tubes connecting said chamber with a lower portion of the container, and blower means in said chamber for circulating liquid vapor through said first set of tubes, chamber and second set of tubes to condense the vapor and return liquid to the container.

* * * * *